O. BUSE.
TIRE.
APPLICATION FILED JAN. 2, 1920.

1,370,280.

Patented Mar. 1, 1921.

WITNESSES
M. L. Weinberg
S. W. Foster

INVENTOR
OSCAR BUSE.
BY Munn & Co.
ATTORNEYS

UNITED STATES PATENT OFFICE.

OSCAR BUSE, OF BROOKLYN, NEW YORK.

TIRE.

1,370,280.　　　　Specification of Letters Patent.　　Patented Mar. 1, 1921.

Application filed January 2, 1920. Serial No. 348,797.

*To all whom it may concern:*

Be it known that I, OSCAR BUSE, a citizen of Peru, and a resident of the city of New York, borough of Brooklyn, in the county of Kings and State of New York, have invented a new and Improved Tire, of which the following is a full, clear, and exact description.

This invention relates to improvements in tires, an object of the invention being to provide a tire with an improved tread or wearing surface which is made with cementitious inserts which increase the wearing qualities of the tire, prevent skidding and prevent punctures and blow-outs.

A further object is to provide a tire having projections or protuberances which are made hollow and in which cementitious inserts are embedded securely anchored in the tire and located flush with the outer face of the tire so that this material, when hardened, forms an artificial stone insert which constitutes a permanent fixed part of the tire.

With these and other objects in view the invention consists in certain novel features of construction, and combinations and arrangements of parts as will be more fully hereinafter described and pointed out in the claims.

In the accompanying drawings—

1 represents a shoe or tire having projections or protuberances on its tread or wearing surface. The tire may be manufactured in any way desired, but is preferably formed as is customary in the art and may be made of laminated fabric with rubber and vulcanized to give the necessary structural strength and stability. My invention is applicable to any ordinary form of tire construction and is not limited to the particular manner of making the tire.

Figure 1:
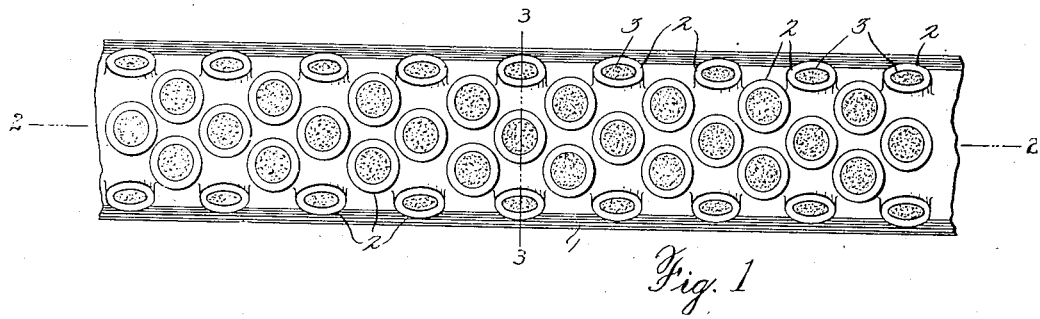
Figure 1 is a fragmentary edge view illustrating one form of my invention.
Figure 2:
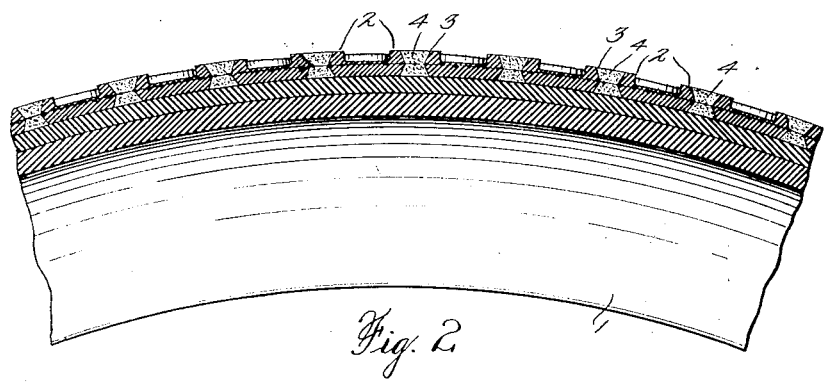
Fig. 2 is a view in longitudinal section on the line 2—2 of Fig. 1.
Figure 3:
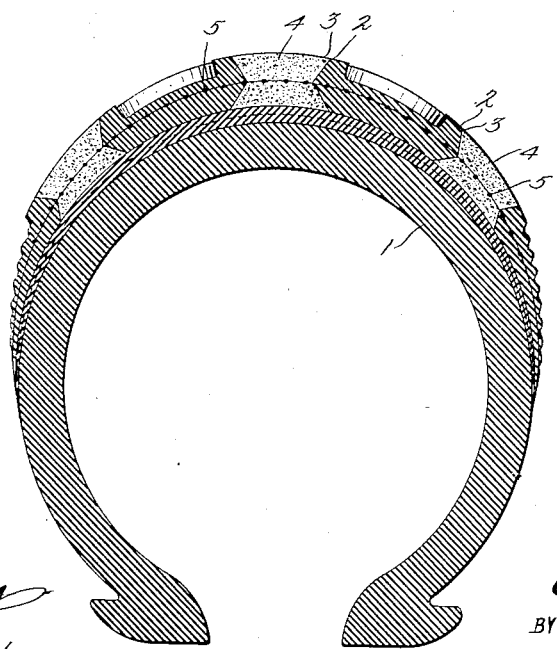
Fig. 3 is a view in transverse section on an enlarged scale on the line 3—3 of Fig. 1.

The projections 2 illustrated in Figs. 1, 2 and 3, are of circular form and are made hollow so as to form pockets 3. These pockets 3 are of least diameter at their intermediate portions and taper to both ends so that when the cement or other similar cementitious material is deposited in the pockets, it will harden and form an insert 4 which is narrowest at its intermediate portion and tapers or increases in diameter to both ends so as to effectually interlock in the pocket and be self-retaining. To further secure the inserts in the tire an openwork fabric binder may be embedded in the material of the tire and extend across the intermediate portions of all of the pockets so that the cementitious material, when placed in the pockets, will pass through the meshes of the binder, and, when set, will effectually interlock with the binder and prevent possibility of accidental disconnection.

As the material is placed in the pockets when wet, it will entirely fill the pocket and when thoroughly set, will form a permanent part of the tire and present a wearing surface to the tread of the tire which not only increases the wear of the tire, but, as above stated, prevents punctures and blow-outs, as well as skidding or slipping of the tire.

The material employed to form the inserts is preferably Portland cement, but it is obviously within the spirit of my invention to employ any cementitious material which can be applied in a wet or plastic form and which, when dry, will set and form, in effect, artificial stone.

I therefore do not wish to be limited to the precise details set forth, but consider myself at liberty to make such changes and alterations as fairly fall within the spirit and scope of the appended claims.

I claim:

1. A tire having a flexible tread portion and having pockets in its tread portion, cementitious inserts in the pockets, and a binder embedded in the tire and extending through the inserts.

2. A tire having a flexible tread portion and having pockets in its tread portion, cementitious inserts in the pockets, and a binder embedded in the tire and extending through the inserts, said binder consisting of an open woven fabric.

OSCAR BUSE.